US012617474B2

(12) United States Patent
Inoue

(10) Patent No.: US 12,617,474 B2
(45) Date of Patent: May 5, 2026

(54) VEHICLE-BODY REAR STRUCTURE

(71) Applicant: SUBARU CORPORATION, Tokyo (JP)

(72) Inventor: Tomoyuki Inoue, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 361 days.

(21) Appl. No.: 18/427,103

(22) Filed: Jan. 30, 2024

(65) Prior Publication Data

US 2024/0278855 A1 Aug. 22, 2024

(30) Foreign Application Priority Data

Feb. 21, 2023 (JP) ................................. 2023-024760

(51) Int. Cl.
 B62D 25/20 (2006.01)
 B62D 25/08 (2006.01)
(52) U.S. Cl.
 CPC ......... B62D 25/2027 (2013.01); B62D 25/08 (2013.01)
(58) Field of Classification Search
 CPC ........ B60N 2/005; B62D 25/04; B62D 25/08; B62D 25/20; B62D 25/2027
 See application file for complete search history.

(56) References Cited

U.S. PATENT DOCUMENTS

2011/0254319 A1 * 10/2011 Amir .................... B62D 25/087
 296/37.2

FOREIGN PATENT DOCUMENTS

| EP | 3543093 A1 * | 9/2019 | ............. B62D 35/02 |
|---|---|---|---|
| JP | 6330621 B | 5/2018 | |
| RU | 219306 U1 * | 1/2023 | |
| WO | WO-2011045982 A1 * | 4/2011 | ............. B60N 2/366 |

* cited by examiner

*Primary Examiner* — Lori Lyjak
(74) *Attorney, Agent, or Firm* — McGinn IP Law Group, PLLC

(57) ABSTRACT

A vehicle-body rear structure for a vehicle includes a stiffening bracket and a seat hinge. The stiffening bracket is provided on a vehicle-widthwise inner side of a rear fender arch of the vehicle on a vehicle front side of a rear wheel house of the vehicle. The rear fender arch is joined to a side sill and a rear pillar of the vehicle. The seat hinge is provided so as to extend in a vehicle width direction of the vehicle on a vehicle lower side of a vehicle seat of the vehicle. The stiffening bracket includes a recessed part recessed outward in the vehicle width direction. The seat hinge includes a vehicle-widthwise outer end that is disposed on a vehicle-widthwise inner side of the recessed part, and to a vehicle-widthwise inner surface of the recessed part with a space between the vehicle-widthwise outer end the vehicle-widthwise inner surface.

2 Claims, 7 Drawing Sheets

VEHICLE-BODY REAR STRUCTURE

CROSS-REFERENCE TO RELATED APPLICATIONS

The present application claims priority from Japanese Patent Application No. 2023-024760 filed on Feb. 21, 2023, the entire contents of which are hereby incorporated by reference.

BACKGROUND

The disclosure relates to a vehicle-body rear structure.

In recent years, in a vehicle such as an automobile, there has been a demand for a vehicle body structure that reduces an amount of deformation inward in a vehicle width direction even when a side-face collision has occurred in the vehicle.

In order to improve rigidity against a side-face collision (hereinafter, referred to as a "side collision") with the spot around a rear seat of the vehicle, it is intended to prevent intrusions of constituent members provided on an outer side in the vehicle width direction toward an inner side in the vehicle width direction through improvement in rigidity of, for example, a rear frame structure such as a rear seat door, a rocker (side sill), a rear pillar, or a rear fender arch.

For example, Japanese Patent No. 6330621 discloses a technique of efficiently transmitting a load applied to a side door at the time of a side collision to a seat member through the inclusion of a rocker (side sill) disposed at a side part of a vehicle, a rear pillar, a reinforcing member that couples the rocker to the rear pillar, the seat member disposed on a vehicle inner side of the reinforcing member, and a load transmission member that transmits the load at the time of the side collision of the vehicle to the seat member.

SUMMARY

An aspect of the disclosure provides a vehicle-body rear structure for a vehicle. The vehicle-body rear structure includes a stiffening bracket and a seat hinge. The stiffening bracket is provided on a vehicle-widthwise inner side of a rear fender arch of the vehicle on a vehicle front side of a rear wheel house of the vehicle. The rear fender arch is joined to a side sill and a rear pillar of the vehicle. The seat hinge is provided so as to extend in a vehicle width direction of the vehicle on a vehicle lower side of a vehicle seat of the vehicle. The stiffening bracket includes a recessed part recessed outward in the vehicle width direction. The seat hinge includes a vehicle-widthwise outer end that is disposed on a vehicle-widthwise inner side of the recessed part, and to a vehicle-widthwise inner surface of the recessed part with a space between the vehicle-widthwise outer end the vehicle-widthwise inner surface.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 6A is a top plan view illustrating a pre-collision deformation at the time of a side collision in the vehicle-body rear structure according to the embodiment of the disclosure, and FIGS. 6B and 6C are top plan views time-serially illustrating a deformation at the time of the side collision in the vehicle-body rear structure according to the embodiment of the disclosure;

DETAILED DESCRIPTION

Figure 1:
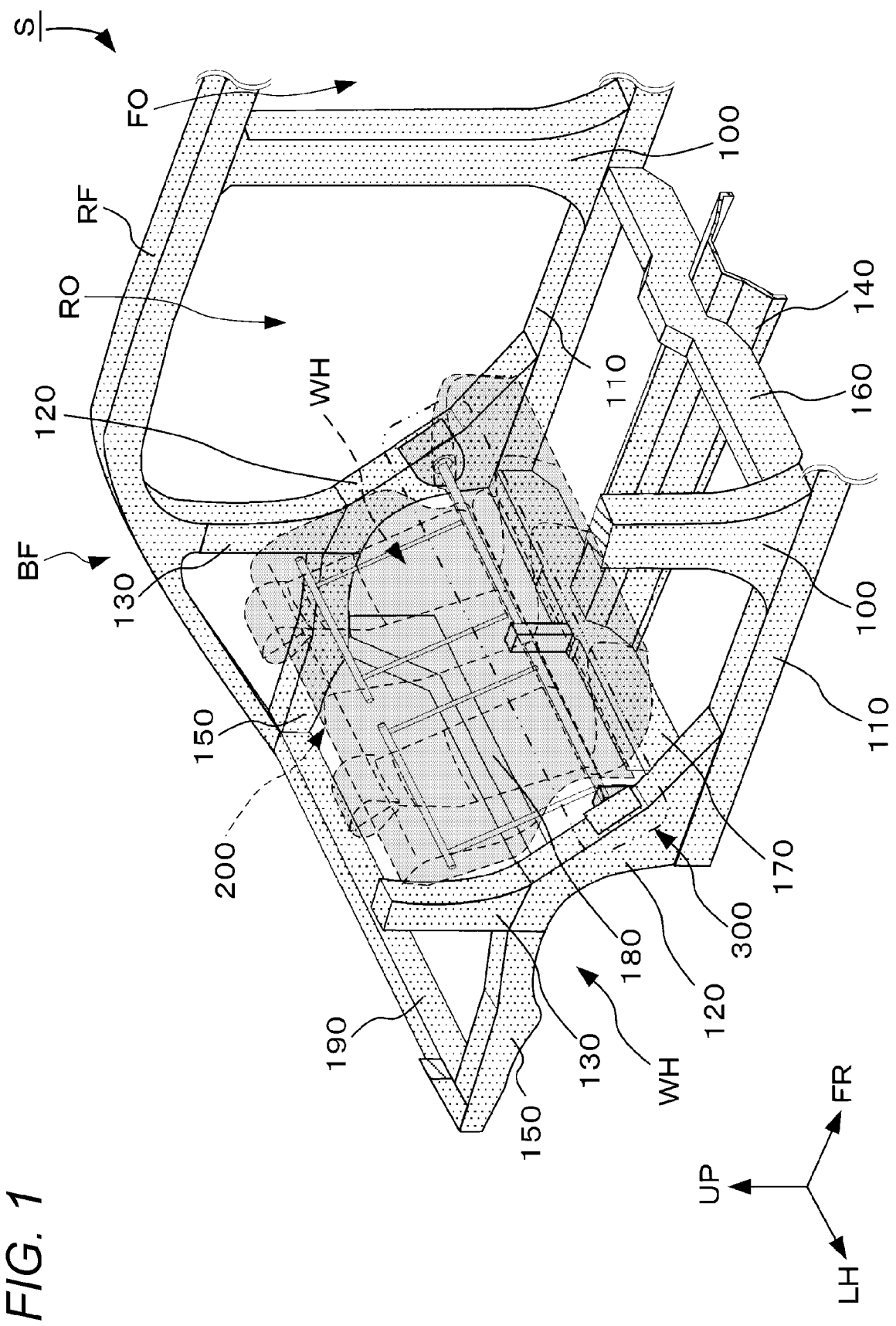
FIG. 1 is a top perspective view of a vehicle-body rear structure according to an embodiment of the disclosure, illustrating a rear seat in a see-through manner.

The technique described in Japanese Patent No. 6330621 has a concern about time-consuming assembling work in fixing a seat to the side part of the vehicle because a seat hinge bracket and a seat hinge are joined or integrated.

It is desirable to provide a vehicle-body rear structure that increases rigidity of a rear seat while maintaining good assembling workability of the rear seat.

Hereinafter, with reference to FIGS. 1 to 6C, a description will be given of a vehicle V to which a vehicle-body rear structure S according to the present embodiment is applied. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. Note that, arrow FR, arrow UP, and arrow LH, which are illustrated as appropriate in the drawings, point to a front side (front), an upper side in a front view, and a left side in a front view, respectively, of the vehicle illustrated in FIG. 1. Additionally, in the following description, unless otherwise specified, an up-down direction, a front-rear direction, and a left-right direction refer to an up-down direction in a front view, a front-rear direction in a front view, and a left-right direction in a front view, respectively.

EMBODIMENT

With reference to FIGS. 1 to 5, a description will be given of a configuration of the vehicle-body rear structure S, according to the present embodiment, included in the vehicle V. The vehicle-body rear structure S is disposed symmetrically in a vehicle width direction. In the present embodiment, a description will be given, as an example, of a right side of the vehicle-body rear structure S in a front view of the vehicle V.

Configuration of Vehicle V

The vehicle V is, for example, a vehicle including, as a drive source, an internal combustion engine or a motor. Note that, the vehicle V may be, for example, a hybrid vehicle including, as drive sources, an internal combustion engine and the motor.

Configuration of Vehicle-Body Rear Structure S

As illustrated in FIG. 1, the vehicle-body rear structure S of the vehicle V includes a rear frame structure BF (dot hatched area in FIG. 1), a side collision-resistance hinge 300, and a rear bench seat 200.

Rear Frame Structure BF

The rear frame structure BF includes center pillars 100, side sills 110, rear fender arches 120, rear pillars 130, a floor tunnel 140, rear side frames 150, a floor front cross member 160, a floor center cross member 170, a floor rear cross member 180, and a rear cross member 190. The rear frame structure BF includes a gridded framework in a vehicle rear part of the vehicle V. Each component constituting the rear frame structure BF is formed of metal or the like having high rigidity and has a substantially rectangular closed cross-sectional shape. Furthermore, on a vehicle upper side of the rear frame structure BF surrounded by the side sills 110, the rear fender arches 120, the rear side frames 150, the floor front cross member 160, and the floor rear cross member 180, a floor panel (not illustrated) is joined to these components of the rear frame structure BF by welding or the like.

Each of the center pillars 100 is disposed between a front door opening FO and a rear door opening RO and forms a framework extending in a vehicle up-down direction. A vehicle upper end of the center pillar 100 is joined by welding or the like to a roof side frame RF extending in a vehicle front-rear direction in an upper part of the vehicle. Additionally, a vehicle lower end of the center pillar 100 is joined to the side sill 110 by welding or the like.

The side sills 110 extend in the vehicle front-rear direction on vehicle-widthwise opposite sides in a lower part of the vehicle. The side sills 110 are frameworks on the vehicle-widthwise opposite sides. The floor tunnel 140 extends in the vehicle front-rear direction between the side sills 110 on the vehicle-widthwise opposite sides. The floor front cross member 160 and the floor center cross member 170 are disposed in the vehicle width direction between the side sills 110 provided on the vehicle-widthwise opposite sides while striding over the floor tunnel 140. The floor front cross member 160 and the floor center cross member 170 are joined to the side sills 110 and the floor tunnel 140 by welding or the like.

Each of the rear fender arches 120 is disposed on a vehicle rear and lower side of the rear door opening RO, and is joined, on a vehicle front side of a rear wheel house WH, to the side sill 110, the rear pillar 130, and the rear side frame 150 by welding or the like. The rear fender arch 120 is disposed on a vehicle-widthwise outer side of a lower part of the rear bench seat 200 that is a vehicle seat. Furthermore, the rear fender arch 120 is provided, on its vehicle-widthwise inner side, with a stiffening bracket 310 and a cover bracket 320, which will be described later.

Each of the rear pillars 130 is disposed on the vehicle rear side of the rear door opening RO and extends in the vehicle up-down direction. The rear pillars 130 are frameworks on the vehicle-widthwise opposite sides. A vehicle upper end of the rear pillar 130 is joined to the roof side frame RF by welding or the like, and a vehicle lower end of the rear pillar 130 is joined to the rear fender arch 120 by welding or the like.

The floor tunnel 140 is disposed, in a bottom part of the vehicle, to have a substantially U shape having a vehicle upper side bulging toward a vehicle interior inner side and having the vehicle lower side opened, and to extend in the vehicle front-rear direction at the vehicle-widthwise central part. A propeller shaft and the like are accommodated on the vehicle lower side of the floor tunnel 140.

On the rear side of the vehicle V, the rear side frames 150 on the vehicle-widthwise opposite sides, the floor rear cross member 180, and the rear cross member 190 form frameworks on the vehicle rear side.

Furthermore, the center pillars 100, the side sills 110, the rear fender arches 120, the rear pillars 130, the floor tunnel 140, the floor front cross member 160, the floor center cross member 170, and the roof side frames RF form firm looped and gridded frameworks on the vehicle-widthwise outer sides and the vehicle lower side of the rear bench seat 200.

Rear Bench Seat 200

Figure 2:
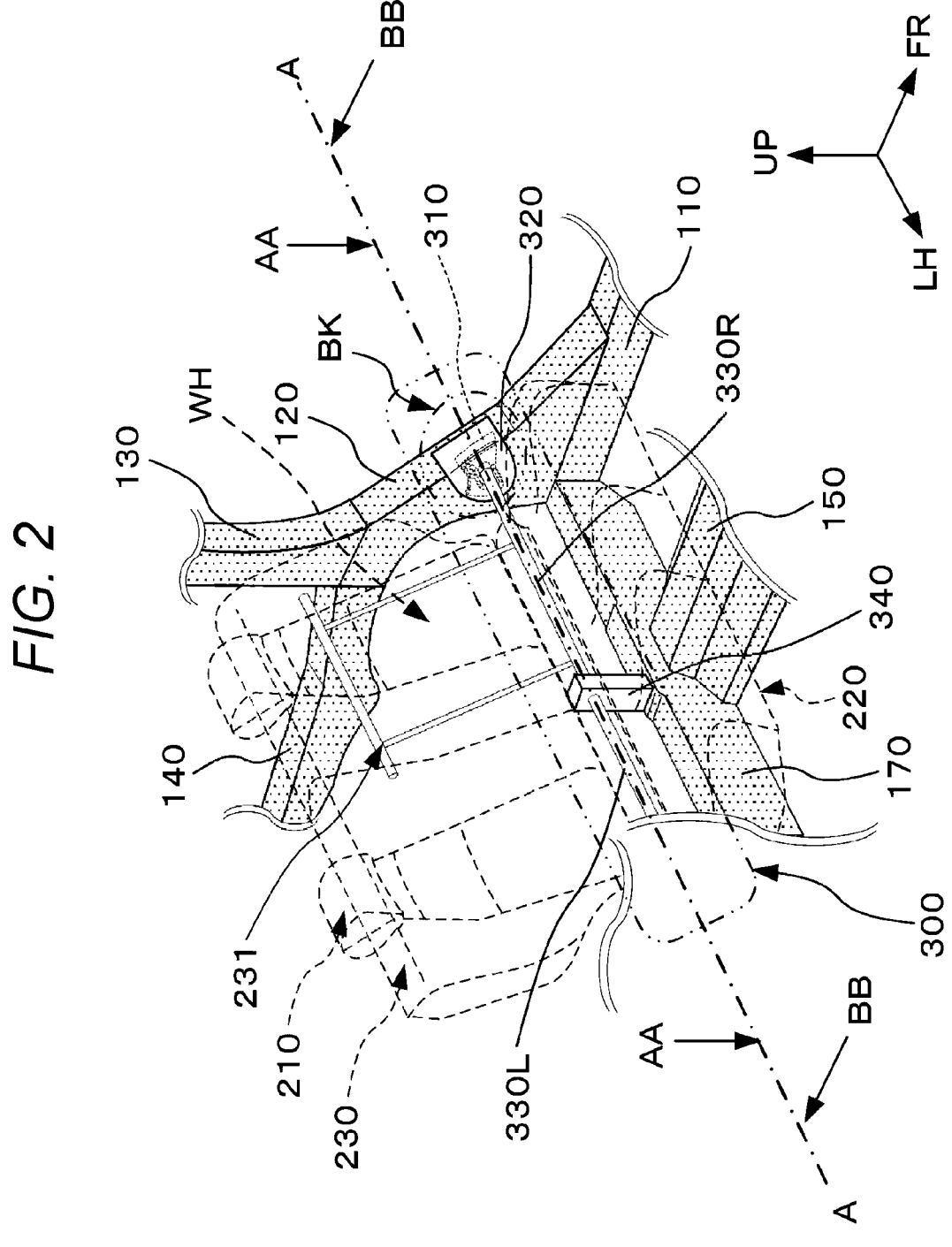
FIG. 2 is an enlarged top perspective view of a rear bench seat and a side collision-resistance hinge, which are illustrated in FIG. 1.

As illustrated in FIG. 2, the rear bench seat 200 is disposed on the vehicle-widthwise inner side of the rear pillar 130 and is fixed to the floor panel (not illustrated) disposed on the vehicle upper side of the floor center cross member 170. The rear bench seat 200 includes headrests 210, seat cushions 220, and seat backs 230.

Each of the headrests 210 is provided at a vehicle-widthwise central part of a vehicle upper end of the seat back 230, and is disposed so as to protrude from the seat back 230 toward the vehicle upper side.

Each of the seat cushions 220 is a seating surface of an occupant P, is disposed in the vehicle lower part of the rear bench seat 200, and supports the hip to the thighs of the occupant P. The seat cushion 220 includes, on its vehicle lower side, a fixing part (not illustrated) through which the seat cushion 220 is fixed to the floor panel of the vehicle V.

Each of the seat backs 230 supports the back of the occupant P. The seat back 230 is disposed in a standing state in the vehicle up-down direction on the vehicle rear side of the seat cushion 220. The seat back 230 includes a cushion (not illustrated) and a seat back frame 231.

The seat back frame 231 forms a framework of the seat back 230 and is formed by joining to each other a frame extending in the vehicle width direction in the vehicle upper part of the seat back 230 and frames extending in the vehicle up-down direction on vehicle-widthwise opposite sides of the seat back 230 by welding or the like. The seat back frames 231 are joined, on its vehicle lower side, to seat hinges 330 (seat hinges 330L and 330R) by welding or the like. Since each of the seat hinges 330 is supported on a support bracket 340 and the cover bracket 320, the seat back frame 231 is fixed to the support bracket 340 and the cover bracket 320 so as to be turnable in the vehicle front-rear direction.

Side Collision-Resistance Hinge 300

As illustrated in FIG. 2, the side collision-resistance hinge 300 includes the seat hinges 330 (seat hinges 330L and 330R), the stiffening bracket 310, the cover bracket 320, and the support bracket 340.

Stiffening Bracket 310

The stiffening bracket 310 is provided on the vehicle-widthwise inner side of the rear fender arch 120 joined to the side sill 110 and the rear pillar 130, on the vehicle front side of the rear wheel house WH. The stiffening bracket 310 is a member formed by subjecting steel or the like to press molding or the like and is joined to the vehicle-widthwise inner side of the rear fender arch 120 by welding or the like.

Figure 3:
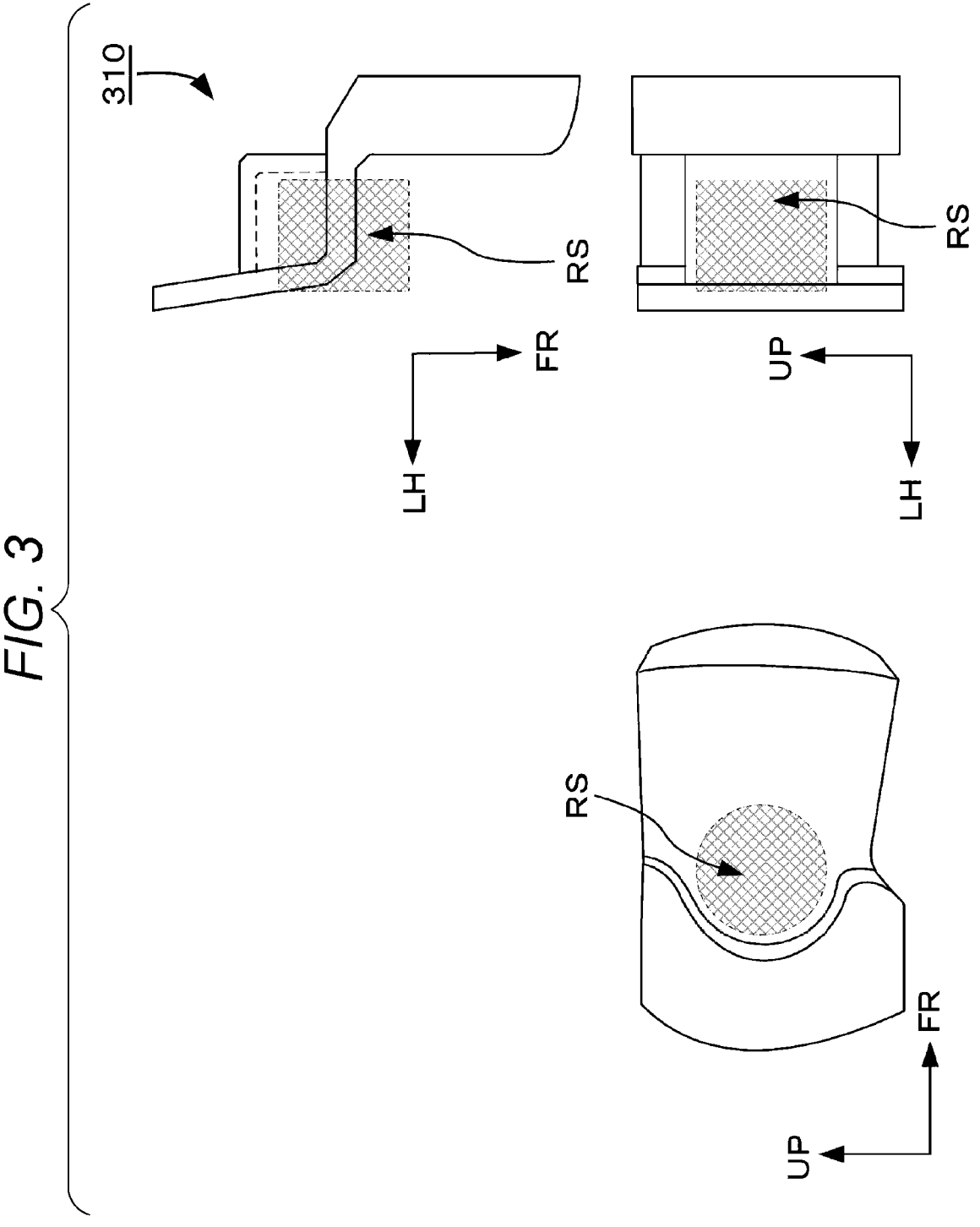
FIG. 3 illustrates, from three different perspectives, a stiffening bracket illustrated in FIG. 2.

As illustrated in FIG. 3, the stiffening bracket 310 has a plate thickness direction corresponding to the vehicle width direction, and a flat surface formed in the vehicle up-down direction. The peripheries of the stiffening bracket 310 in the vehicle up-down direction and the vehicle front-rear direction are bent so as to be fittable to the rear fender arch 120 disposed on the vehicle-widthwise outer side.

The stiffening bracket 310 has a recessed part RS that is recessed outward in the vehicle width direction. As indicated by a hatched area in FIG. 3, the recessed part RS is recessed outward in the vehicle width direction on the vehicle front side than on the vehicle rear side such that a substantially cylindrical member can be accommodated. The flat surface that is a bottom surface of the recessed part RS is formed on the vehicle front side of the stiffening bracket 310.

Cover Bracket 320

Figure 4:
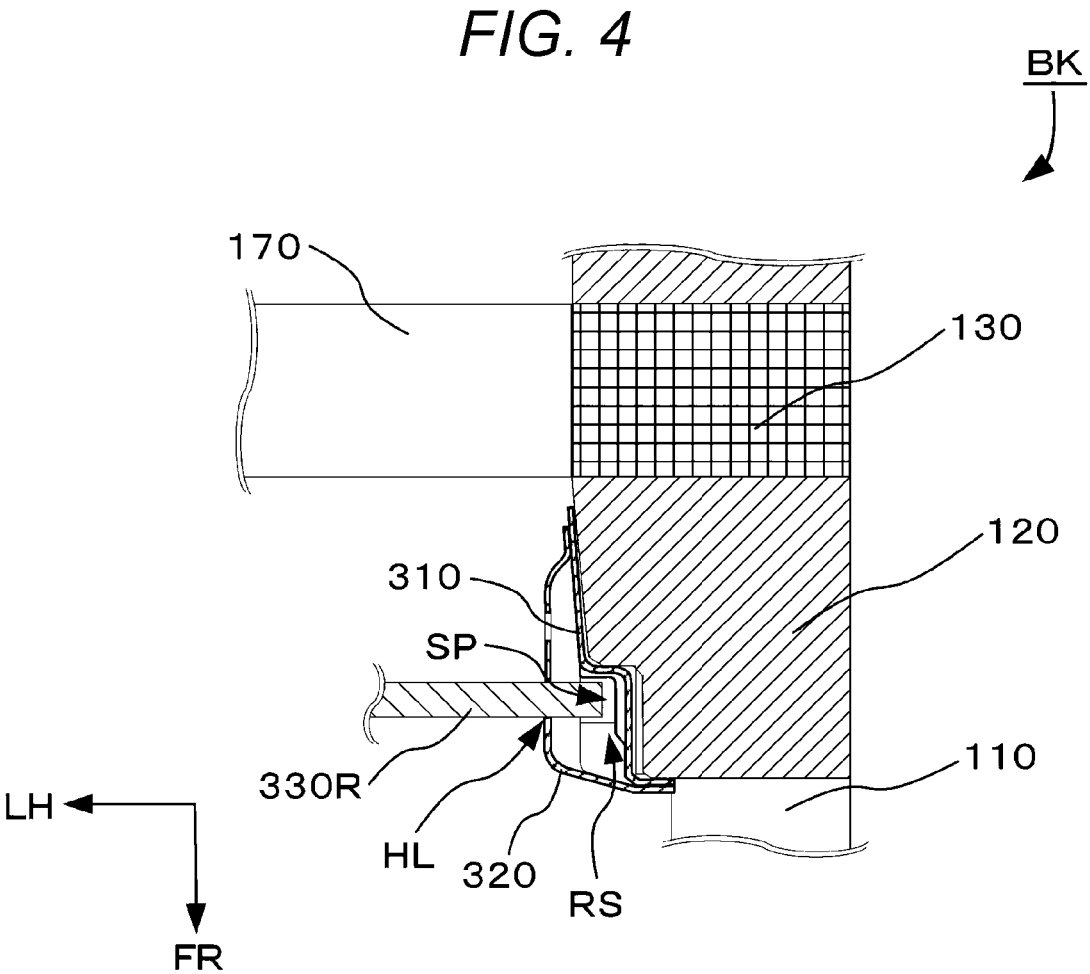
FIG. 4 is a cross-sectional view of an area BK illustrated in FIG. 2, the cross-sectional view being taken along line A-A as viewed in a direction of arrows AA.

The cover bracket 320 is a member formed by subjecting steel or the like to press molding or the like, and, as illustrated in FIG. 4, is joined, by welding or the like, to the vehicle-widthwise inner side of the rear fender arch 120 so as to cover the stiffening bracket 310.

The cover bracket 320 has a substantially rectangular shape, in a side view, in which a plate thickness direction corresponds to the vehicle width direction and a longitudinal direction corresponds to the vehicle front-rear direction, and has a semi-elliptical space outside in the vehicle width direction. The cover bracket 320 has, on its vehicle-widthwise inner side, a substantially circular through hole HL so as to overlap the recessed part RS of the stiffening bracket 310 when viewed from inside in the vehicle width direction.

The through hole HL of the cover bracket 320 allows the seat hinge 330 to pass therethrough and to be rotatably supported thereon.

Seat Hinges 330 (Seat Hinges 330L and 330R)

As illustrated in FIG. 2, the seat hinges 330 (seat hinges 330L and 330R) are each joined, by welding or the like, to the vehicle lower side of the seat back frame 231 provided inside the rear bench seat 200, and form frameworks of the vehicle lower part in the rear bench seat 200. Each of the seat hinges 330 is a round bar or a pipe-shaped bar formed of a member such as steel and provided to extend in the vehicle width direction on the vehicle lower side of the rear bench seat 200. The seat hinge 330 has a vehicle-widthwise inner end that is rotatably fitted to and supported on the support bracket 340.

Furthermore, the cover bracket 320 is provided at the rear fender arch 120 on the vehicle-widthwise outer side of the seat hinge 330. The seat hinge 330 is rotatably supported on the cover bracket 320.

As illustrated in FIG. 4, the seat hinge 330 has a vehicle-widthwise outer end that is allowed to pass through and to be supported on the cover bracket 320, which will be described later, provided at the rear fender arch 120, and that is disposed proximate, across a space SP, to a vehicle-widthwise inner surface of the recessed part RS of the stiffening bracket 310.

Support Bracket 340

Figure 5:
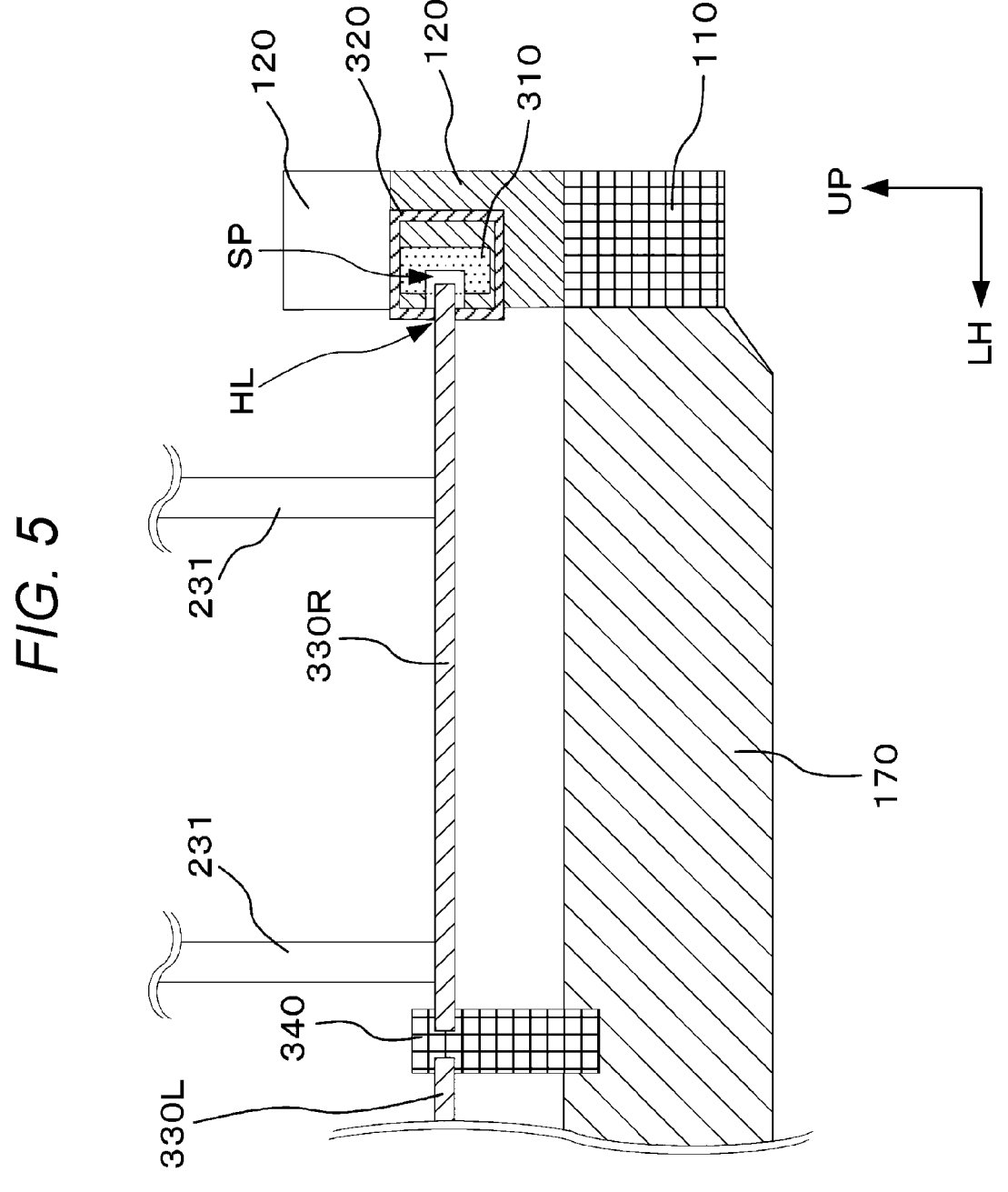
FIG. 5 is a cross-sectional view taken along line A-A as viewed in a direction of arrows BB illustrated in FIG. 2.

The support bracket 340 is a bearing that rotatably supports the seat hinge 330. As illustrated in FIG. 5, the support bracket 340 has bearing holes that each allow the vehicle-widthwise inner end of the seat hinge 330 to be rotatably fitted thereto and the seat hinge 330 to be supported thereon. The support bracket 340 is firmly fixed, on its vehicle lower side, to the floor center cross member 170, with bolts or the like, through the floor panel (not illustrated).

Operation and Effects

In the vehicle-body rear structure S according to the present embodiment with the above configuration, upon occurrence of the side collision, the collision object externally collides on an either side in the vehicle width direction of the vehicle. Hereinafter, with reference to FIGS. 5 and 6A to 6C, a description will be given of the assemblability of the vehicle-body rear structure S and an operation upon occurrence of the side collision.

Assembling Work

In assembling the rear bench seat 200 into the vehicle V in the vehicle-body rear structure S, for example, the seat back 230, the seat cushion 220, and the headrest 210 are assembled in this order.

In the seat back 230, the seat hinge 330 is assembled to the rear fender arch 120, and the support bracket 340 is assembled to the floor center cross member 170.

The rear fender arch 120 is fixed in advance with the stiffening bracket 310 and the cover bracket 320 that serve as the side collision-resistance hinge 300. The cover bracket 320 has, on its vehicle-widthwise inner side, the substantially circular through hole HL so as to overlap the recessed part RS of the stiffening bracket 310 when viewed from inside in the vehicle width direction.

As illustrated in FIG. 5, the vehicle-widthwise outer end of the seat hinge 330 is allowed to pass through and to be supported on the cover bracket 320 provided at the rear fender arch 120, and is disposed proximate, across the space SP, to the vehicle-widthwise inner surface of the recessed part RS of the stiffening bracket 310. The vehicle-widthwise outer end of the seat hinge 330 is not fixed to the stiffening bracket 310 and the cover bracket 320 that serve as the side collision-resistance hinge 300 in order to secure the space SP between the vehicle-widthwise outer end and the stiffening bracket 310.

Thus, the assembling work of assembling the seat hinge 330 into the rear fender arch 120 is work of inserting the vehicle-widthwise outer end of the seat hinge 330 into the through hole HL provided in the cover bracket 320.

The seat back 230 is fixed, with bolts or the like, to the floor panel of the vehicle V by fixing, with bolts or the like, the support bracket 340 to the floor center cross member 170 through the floor panel on the vehicle lower side of the seat back 230.

The seat cushion 220 is fixed to the floor panel of the vehicle V by fixing, with a bolt or the like, the fixing part provided on the vehicle lower side of the seat cushion 220 to the floor panel of the vehicle V.

Then, the headrest 210 is inserted into the vehicle upper side of the seat back 230, and the assembling work of the rear bench seat 200 is completed.

Upon Occurrence of Side Collision

Figures 6A, 6B, 6C:
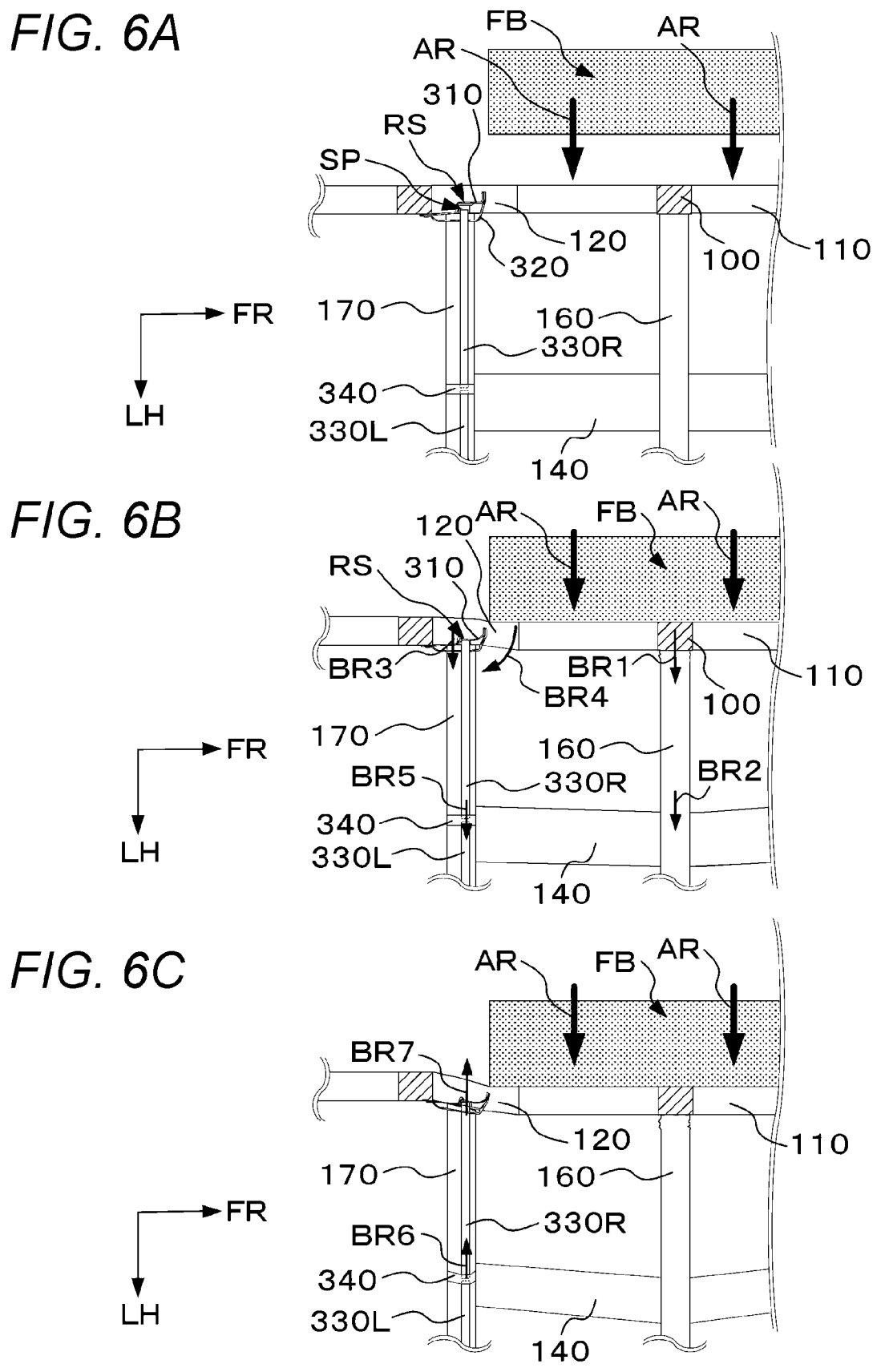

In a case of a side collision of the vehicle V with a collision object FB, as illustrated in FIG. 6A, collision energy is generated with respect to the vehicle V in a direction indicated by arrows AR. The collision energy, as indicated by arrows AR, from the lateral side of the vehicle is transmitted to a rear door (not illustrated), the center pillar 100, the side sill 110, and the rear fender arch 120.

As illustrated in FIG. 6B, the transmitted collision energy pushes, as indicated by arrow BR1, the center pillar 100 and the side sill 110 inward in the vehicle width direction. The floor front cross member 160 disposed in the vehicle width direction is pushed and deformed inward in the vehicle width direction by the collision energy transmitted from the side sill 110. As indicated by arrow BR2, the floor front cross member 160 causes deformations of the floor tunnel 140 joined to the floor front cross member 160 and the side sill 110 provided on a side opposite to the side where the side collision has occurred. The center pillar 100, the side sills 110 on the vehicle-widthwise opposite sides, the floor front cross member 160, and the floor tunnel 140 are deformed by the collision energy, whereby the collision energy is distributed and absorbed in these components.

On the other hand, the rear fender arch 120 joined to the side sill 110 is pushed inward in the vehicle width direction as indicated by arrow BR3 and, at the same time, is deformed while being turned in a direction indicated by arrow BR4 with, as a fulcrum, a joint between the rear fender arch 120 and the floor center cross member 170. In the stiffening bracket 310, although the space SP is secured between the recessed part RS and the seat hinge 330, the recessed part RS abuts against the vehicle-widthwise outer end of the seat hinge 330 when the rear fender arch 120 is pushed inward in the vehicle width direction. Then, the recessed part RS pushes the seat hinge 330 inward in the vehicle width direction as indicated by arrow BR3. The vehicle-widthwise inner end of the seat hinge 330 is pushed in a direction indicated by arrow BR5, thereby deforming the support bracket 340. Furthermore, the support bracket 340 causes the vehicle-widthwise outer end of the seat hinge 330 to be brought into contact with the recessed part RS provided in the rear fender arch 120 on the side opposite to the side where the side collision has occurred. Thus, a reaction force pushing back inward in the vehicle width direction is generated in the rear fender arch 120 on the side opposite to the side where the side collision has occurred. As illustrated in FIG. 6C, a reaction force is generated in the support bracket 340 in a direction indicated by arrow BR6, and a reaction force indicated by arrow BR7 is transmitted to the rear fender arch 120, thereby restricting the deformation of the rear fender arch 120. Additionally, the collision energy is distributed and absorbed, through the seat hinge 330 and the support bracket 340, in the rear fender arch 120 on the side opposite to the side where the side collision has occurred.

As described above, the collision energy is efficiently distributed in the firm gridded framework formed by the rear frame structure BF and the side collision-resistance hinges 300 and is absorbed by means of the deformation of the framework.

When the input of the collision energy ends, the absorption of the collision energy by means of the deformation of the vehicle-body rear structure S ends.

As described above, the vehicle-body rear structure S according to the present embodiment includes the stiffening bracket 310 provided on the vehicle-widthwise inner side of the rear fender arch 120 joined to the side sill 110 and the rear pillar 130, on the vehicle front side of the rear wheel house WH, and the seat hinge 330 provided to extend in the vehicle width direction on the vehicle lower side of the rear bench seat 200 that is the vehicle seat. The stiffening bracket 310 has the recessed part RS recessed outward in the vehicle width direction. The seat hinge 330 has the vehicle-widthwise outer end disposed proximate, across the space SP, to the vehicle-widthwise inner surface of the recessed part RS, on the vehicle-widthwise inner side of the recessed part RS.

That is, in the vehicle-body rear structure S, the stiffening bracket 310 and the seat hinge 330 that serve as the side collision-resistance hinge 300 are disposed in proximity to each other across the space SP, and upon occurrence of the side collision, the rigidity of the rear fender arch 120 against the side collision can be increased by abutting of the stiffening bracket 310 against the seat hinge 330 and restricting the deformation of the rear fender arch 120.

Since the seat hinge 330 is disposed in proximity to the stiffening bracket 310 provided at the rear fender arch 120, the assembling work of assembling the rear bench seat 200 into the rear fender arch 120 can be completed by inserting the seat hinge 330 into the through hole HL of the cover bracket 320 directed toward the vehicle inner side of the stiffening bracket 310.

Thus, the rigidity of the rear seat can be increased while maintaining good assembling workability of the rear seat.

Furthermore, the vehicle-body rear structure S according to the present embodiment further includes the cover bracket 320 having, in a side view from inside in the vehicle width direction, the through hole HL so as to overlap the recessed part RS of the stiffening bracket 310, the cover bracket 320 being disposed on the vehicle-widthwise inner side of the stiffening bracket 310 so as to cover the stiffening bracket 310. The seat hinge 330 is disposed so as to pass through the through hole HL of the cover bracket 320.

That is, the vehicle-widthwise outer end of the seat hinge 330 is not fixed to the stiffening bracket 310 and the cover bracket 320 that serve as the side collision-resistance hinge 300 in order to secure the space SP between the vehicle-widthwise outer end and the stiffening bracket 310. Thus, the assembling work of assembling the seat hinge 330 into the rear fender arch 120 can be completed by inserting the seat hinge 330 into the through hole HL of the cover bracket 320.

Thus, the assembling workability of the rear seat can be satisfactorily maintained.

First Modification Example

Figure 7:
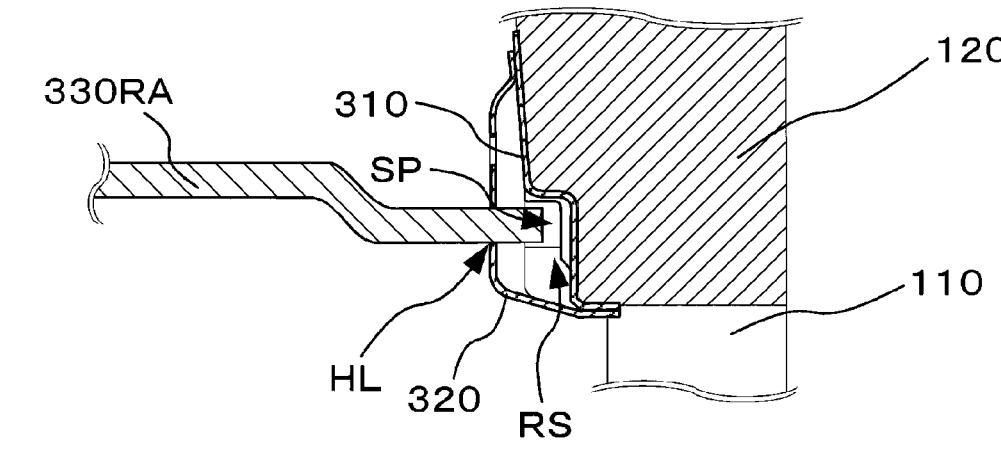
FIG. 7 is a cross-sectional view illustrating a first modification example of a seat hinge illustrated in FIG. 2, the cross-sectional view being taken along line A-A as viewed in the direction of arrows AA.
Figure 7:
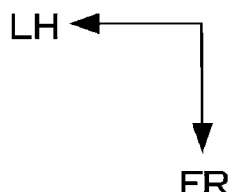

As the embodiment of the disclosure, the example has been described in which the seat hinges 330 (seat hinges 330L and 330R) are each the substantially straight round bar or the substantially straight pipe-shaped bar. However, as illustrated in FIG. 7, the seat hinges 330A (seat hinges 330LA and 330RA) may each have a vehicle-widthwise outer end bent in the vehicle front-rear direction or in the vehicle up-down direction.

For example, when the seat hinge 330A and the stiffening bracket 310 cannot be disposed substantially linearly because of a restriction in the arrangement positions of the constituent members of the rear bench seat 200, the seat hinge 330A is allowed to pass through and to be supported on the cover bracket 320 by bending the vehicle-widthwise outer end of the seat hinge 330A, and can be disposed proximate, across the space SP, to the vehicle-widthwise inner surface of the recessed part RS of the stiffening bracket 310.

Furthermore, the assembling work of assembling the seat hinge 330A into the rear fender arch 120 can also be completed by inserting the seat hinge 330A into the through hole HL of the cover bracket 320.

Thus, the rigidity of the rear seat can be increased while maintaining good assembling workability of the rear seat. Furthermore, the change in shape of the bent part of the seat hinge 330A facilitates diversion to another vehicle type.

Second Modification Example

Furthermore, as the embodiment of the disclosure, the example has been described in which the seat hinges 330

Figure 8:
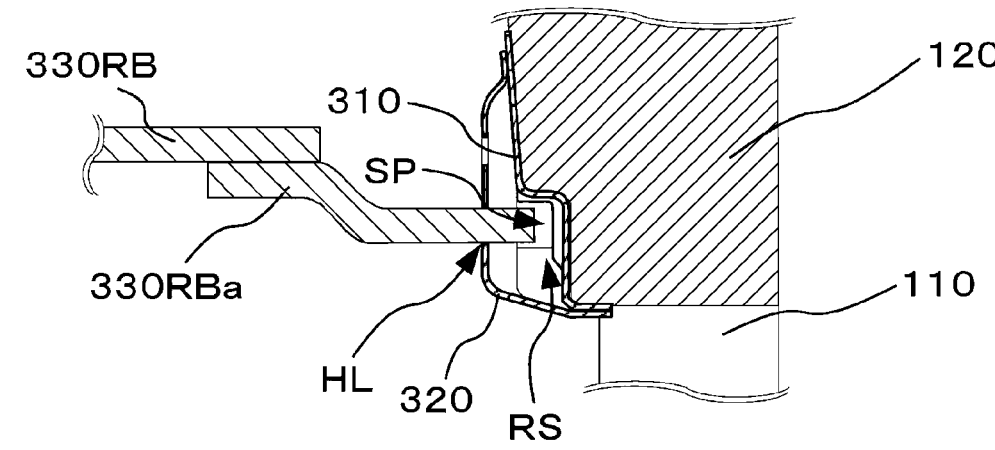
FIG. 8 is a cross-sectional view illustrating a second modification example of the seat hinge illustrated in FIG. 2, the cross-sectional view being taken along line A-A as viewed in the direction of arrows AA.
Figure 8:
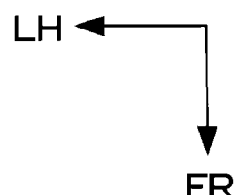

(seat hinges 330L and 330R) are each the substantially straight round bar or the substantially straight pipe-shaped bar. However, as illustrated in FIG. 8, support members 330Ba (support member 330LBa and 330RBa) may be joined to vehicle-widthwise outer ends of seat hinges 330B (seat hinges 330LB and 330RB) and may be bent.

For example, when the seat hinge 330B and the stiffening bracket 310 cannot be disposed substantially linearly because of a restriction in the arrangement positions of the constituent members of the rear bench seat 200, the support member 330Ba is allowed to pass through the through hole HL of the cover bracket 320 by providing the vehicle-widthwise outer end of the seat hinge 330B with the support member 330Ba, and can be disposed proximate, across the space SP, to the vehicle-widthwise inner surface of the recessed part RS of the stiffening bracket 310.

Furthermore, the assembling work of assembling the seat hinge 330B into the rear fender arch 120 can also be completed by inserting the support member 330Ba of the seat hinge 330B into the through hole HL of the cover bracket 320.

Thus, the rigidity of the rear seat can be increased while maintaining good assembling workability of the rear seat. Furthermore, the change in shape of the support member 330Ba facilitates diversion to another vehicle type.

Although the embodiment of the disclosure has been described in detail with reference to the drawings, the specific configuration is not limited to the embodiment, and encompasses, for example, design variation within a scope not departing from the gist of the disclosure.

The invention claimed is:

1. A vehicle-body rear structure for a vehicle, the vehicle-body rear structure comprising:

a stiffening bracket provided on a vehicle-widthwise inner side of a rear fender arch of the vehicle on a vehicle front side of a rear wheel house of the vehicle, the rear fender arch being joined to a side sill and a rear pillar of the vehicle; and a seat hinge provided so as to extend in a vehicle width direction of the vehicle on a vehicle lower side of a vehicle seat of the vehicle, wherein the stiffening bracket comprises a recessed part recessed outward in the vehicle width direction, and the seat hinge comprises a vehicle-widthwise outer end that is disposed on a vehicle-widthwise inner side of the recessed part, and proximate to a vehicle-widthwise inner surface of the recessed part with a space between the vehicle-widthwise outer end the vehicle-widthwise inner surface.

2. The vehicle-body rear structure according to claim 1, further comprising a cover bracket having a through hole in a side view from inside in the vehicle width direction so as to overlap the recessed part of the stiffening bracket, the cover bracket being disposed on a vehicle-widthwise inner side of the stiffening bracket so as to cover the stiffening bracket, wherein the seat hinge is disposed so as to pass through the through hole of the cover bracket.

\*    \*    \*    \*    \*